Patented Aug. 14, 1928.

1,680,656

UNITED STATES PATENT OFFICE.

EDMUND B. WHEELER, OF MIDLAND PARK, AND JAMES C. WRIGHT, OF MILLBURN, NEW JERSEY, ASSIGNORS TO WESTERN ELECTRIC COMPANY, INCORPORATED, OF NEW YORK, N. Y., A CORPORATION OF NEW YORK.

STORAGE OF DRY CELLS AND BATTERIES.

No Drawing. Application filed June 7, 1924. Serial No. 718,559.

This invention relates to the storage of dry cells or other batteries and particularly to the prevention of loss of energy of such batteries.

An object of the invention is to provide a method for obtaining increased energy from dry batteries and increasing their useful life.

Other objects are to increase the uniformity of output of dry batteries; improve the methods of distribution of dry batteries; and to provide for the shipment of dry batteries to tropical countries with less deterioration.

It has been found that dry batteries placed in cold storage have a very slow rate of deterioration except in the case where the batteries are defective, and furthermore, that batteries manufactured during cold weather give better service on the average than those manufactured during warm weather. In fact, it has been found that cells manufactured during the winter and placed in cold storage for a period of several months normally have a longer life than those manufactured during the hot summer months.

Under present conditions the maximum demand for dry cells occurs during the autumn and early winter months. Inasmuch as cells kept throughout the summer at ordinary temperatures would greatly depreciate, it is inefficient to store up the product made during the previous winter and spring to meet this demand. It is likewise inefficient to manufacture in usually large quantities during the summer on account of the somewhat shorter life given by the summer-made product. Consequently, it is rather important for the manufacturer to be able to manufacture dry batteries at a more or less uniform rate throughout the year and store them during periods of slack demand in order to distribute the peak production and meet the variable demand throughout the year. This enables the manufacturer to maintain a more or less even output and to employ steadily a uniform number of workmen. The economic advantages of this are important particularly in view of the modern tendency of industry to depart from the larger centers of labor and locate in smaller towns where the necessary additional help cannot be obtained easily when the peak demand season arrives. The advantage to the workmen in being employed throughout the year is an important economic consideration not to be overlooked.

Ordinarily, during the early summer months there is a reduction in the commercial demand for dry cells which is usually followed by a peak demand some months later. Cells manufactured during the spring or winter months and placed in cold storage for several months during the hottest part of the summer normally have a longer useful life than those manufactured during the hot summer months so that by the practice of the present invention there may actually be a gain in the average life in the hands of the ultimate consumer of a manufacturer's whole product. By lessening the production during the hot weather the production throughout the year is thus equalized and a greater proportion of cells are of increased efficiency.

Small dry cells such as are used in radio sets and flashlights often have some inherent defect such as an internal short circuit which consumes the cell. If such cells stand on dealers' shelves they soon become exhausted and are not marketable. If they reach the consumer before being exhausted they are unduly short-lived in his hands with resultant loss of reputation of the manufacturer. It has been found by others in the practice of applicants' invention that when dry cells are put into cold storage, the consuming process due to defects or local circuits goes on almost as rapidly as at ordinary room temperatures so that the cold storage of cells preliminary to jacketing them serves not only to keep the good cells without deterioration but also affords a means of sharply discriminating between good cells and defective cells since at the end of the periods the defective cells show up in very unfavorable contrast. It is, therefore, very advantageous to put assembled cells in cold storage for several months and then to take the cells out of storage, test them in order to eliminate the defective ones, finish the cells by putting them into proper jackets, and distribute them. This also has the attendant advantage of avoiding the labor and expense of jacketing and finishing the defective cells.

Under present conditions it is disadvantageous for dealers to keep on hand large stocks of dry cells on account of the rapid deterioration. In accordance with the present invention large dealers would be able to keep in cold storage large stocks of dry cells at various centers of distribution throughout the country. These stocks would deteriorate very little for long periods of time but would serve to meet the fluctuating demand.

The invention may be made use of in shipping dry cells in the summer time over long distances and especially by shipping them to and preserving them in tropical countries.

Other uses and advantages of the invention may occur to those skilled in the art and consequently it is not desired to limit the application of the invention to those situations where the particular advantages here in set forth accrue.

In accordance with certain experimental tests which were conducted through a period of three years there was obtained the striking result that after one year of cold storage at 34° F. (1° C.) normal dry cell batteries gave from 93 to 97% of their original life, although cells stored at normal temperatures for the same period gave from 61 to 62% of their original life, and those stored at high temperatures of 100° F. (38° C.) gave from 18 to 44% of their original life. Subsequently other series of tests upon several additional types of dry cells gave results of substantially the same order.

Having set forth the novel principles involved in the invention and the method of practicing it we define in the appended claims the features believed to be novel and patentable.

What is claimed is:

1. The method of preserving cells for chemical storage of electrical energy for long periods of time which comprises subjecting the cells to be preserved to cold storage temperatures below 10° C.

2. The method of preserving electrical energy stored in the form of chemical energy which comprises refrigerating at a temperature constant within narrow limits and having its upper limit below 10° C. the chemical materials in which the electrical energy is stored in order to prevent dissipation of the energy through undesired and unutilized chemical action.

3. The method of shipping electrical batteries without loss of energy which comprises subjecting the batteries to a temperature below 10° C. en route.

4. The method of conserving a battery while not in use which consists in placing the battery in a container having a dry insulating medium inert with respect to the elements of the battery and maintaining the battery at a temperature below 10 degrees centigrade.

5. The method of conserving a battery while not in use which consists in placing the battery in a container having an insulating medium inert with respect to the elements of the battery which medium fuses at a point below 25 degrees centigrade and maintaining the temperature of the battery below 10 degrees centigrade.

6. The method of conserving a battery while not in use which consists in placing the battery in a container having an insulating medium inert with respect to the elements of the battery, which medium evaporates at a point below 25 degrees centigrade and maintaining the temperature of the battery below 10 degrees centigrade.

7. The method of conserving a battery while not in use which consists in placing the battery in a container having an insulating medium inert with respect to the elements of the battery, which medium solidifies at a point below 25 degrees centigrade, and maintaining the temperature of the battery below 10 degrees centigrade.

8. The method of conserving the battery while not in use which consists in placing the battery in a container having a dry insulating gas inert with respect to the elements of the battery and maintaining the battery at a temperature below 10 degrees centigrade.

In witness whereof, we hereunto subscribe our names this 31st day of May A. D., 1924.

EDMUND B. WHEELER.
JAMES C. WRIGHT.